United States Patent
Acker et al.

(10) Patent No.: US 6,393,965 B1
(45) Date of Patent: May 28, 2002

(54) PIVOT MOTOR

(75) Inventors: Bernd Acker, Esslingen; Werner Busch, Weinstadt, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/542,401

(22) Filed: Apr. 4, 2000

(30) Foreign Application Priority Data

Apr. 10, 1999 (DE) .......................... 199 16 207

(51) Int. Cl.⁷ .................................. F01C 9/00
(52) U.S. Cl. ............................... 92/124; 92/184
(58) Field of Search .......................... 62/121, 124, 125, 62/184

(56) References Cited

U.S. PATENT DOCUMENTS

| | | | |
|---|---|---|---|
| 2,372,710 A | * 4/1945 | Chisholm | ............... 92/184 |
| 3,030,934 A | 4/1962 | Herbst | |
| 3,659,503 A | * 5/1972 | Ehluss et al. | ............... 92/125 |
| 3,937,130 A | * 2/1976 | Adams et al. | ............... 92/125 |
| 4,475,738 A | 10/1984 | Eicher | |

FOREIGN PATENT DOCUMENTS

| DE | 3420150 | 12/1985 |
|---|---|---|
| DE | 4337815 | 2/1995 |
| DE | 19742881 | 4/1999 |

* cited by examiner

Primary Examiner—F. Daniel Lopez
(74) Attorney, Agent, or Firm—Kenyon & Kenyon

(57) ABSTRACT

For a pivot motor with frame-like sealing elements which are situated in grooves of its vanes, the invention proposes a design in which the frame has an encircling channel which faces its interior and in which an inner sealing insert engages by means of its periphery.

11 Claims, 2 Drawing Sheets

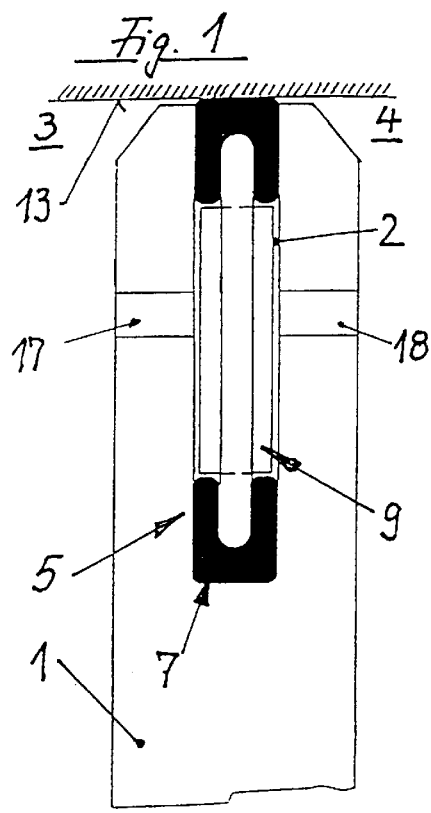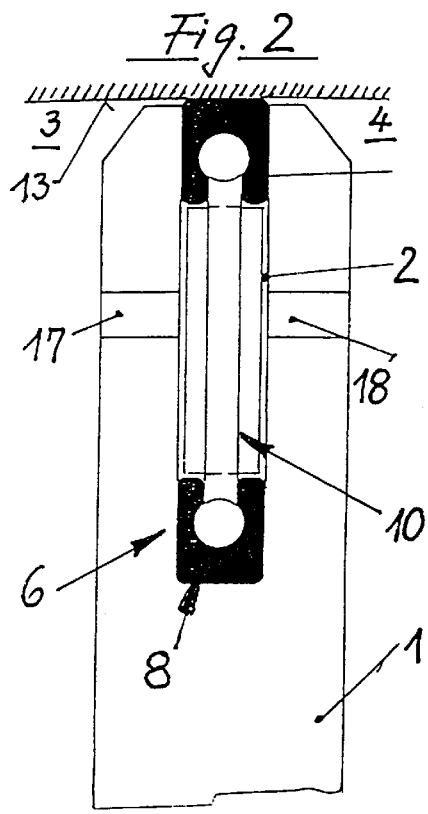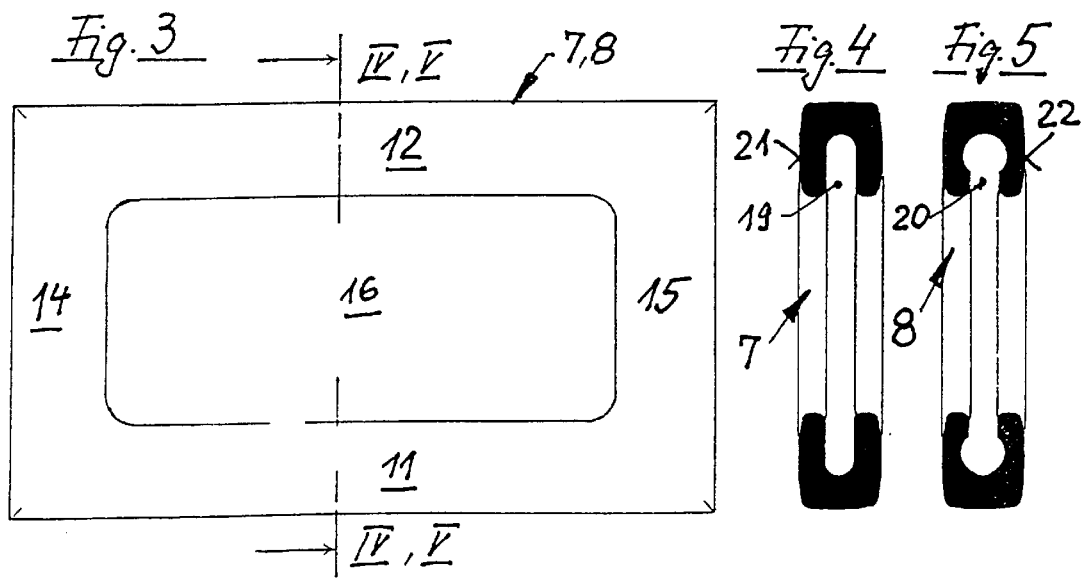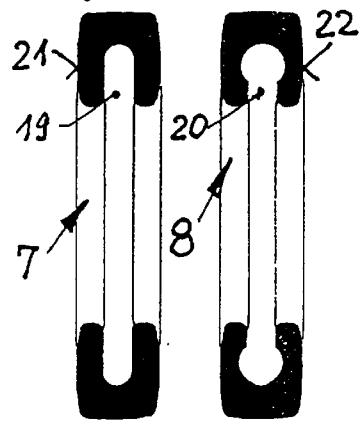

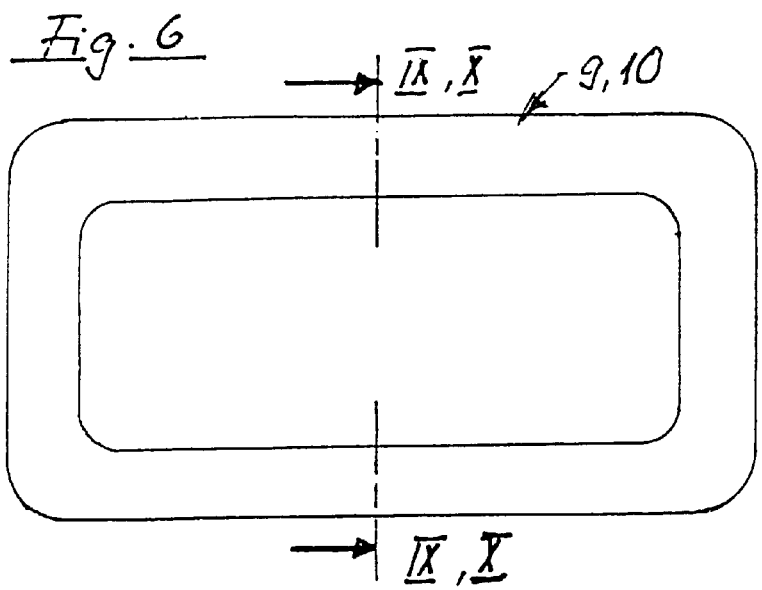
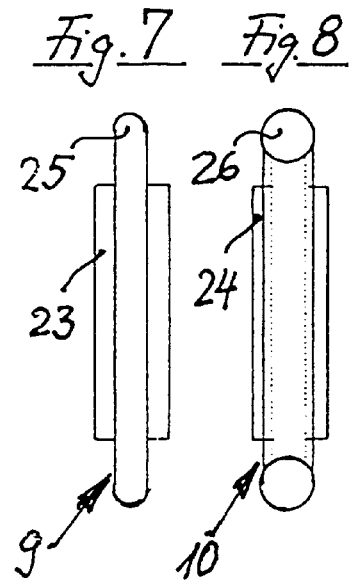
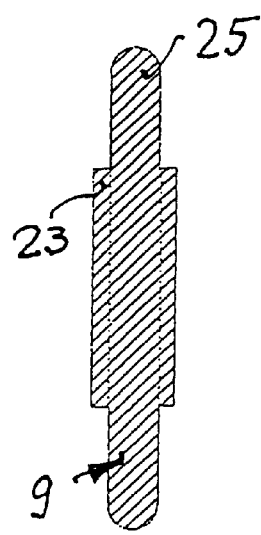
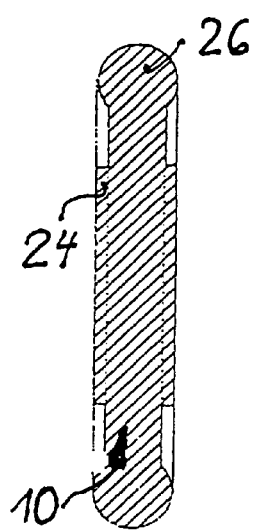

PIVOT MOTOR

CROSS REFERENCE TO RELATED APPLICATION

Priority is claimed with respect to German application No. 199 16 207.7-14 filed in Germany on Apr. 10, 1999, the disclosure of which is incorporated herein by reference.

BACKGROUND OF THE INVENTION

The invention generally relates to a pivot motor and particulary to the sealing of a pivot motor.

Pivot motors of the abovementioned type are known from DE 43 37 815 C1 and are provided in the tip region of their housing and shaft vanes, which delimit working chambers that follow one another in the circumferential direction, with grooves in which there are sealing elements which, as frame-shaped sealing elements, form a closed sealing boundary between the respective working chambers, in which they form a seal between the groove base and the respectively opposite peripheral boundary on the housing or shaft side and the mutually opposite end boundaries, which are at an angle to the said peripheral boundary.

In the known solution, the sealing elements each comprise a sealing frame which surrounds an inner sealing insert, this sealing insert comprising a central inner body and an elastomer ring which lies between the central inner body and the frame and by means of which the frame is loaded towards the associated sealing boundaries and by means of which the sealing element is also connected to a pressure-tight, disc-shaped unit transversely to the frame plane. Arranged in the groove together with this unit and supporting the latter in the transverse direction there is in each case a disc-shaped filler body which effects transverse stabilization of the multi-part sealing element and allows adaptation to the respective groove width.

Pressure fluid passes out of the working chamber respectively supplied with pressure medium, along the surfaces of the housing and the shaft with which the sealing element interacts, and into the respective groove and here acts on the sealing element, the pressure medium also intensifying the contact pressure acting on the sealing frame.

The construction described of the sealing element with an associated filler piece forms a relatively complicated unit which is not easy to handle during assembly.

DE 197 42 881 A1 has furthermore disclosed a pivot motor, the working spaces of which are separated from one another by vanes which are provided with radial grooves running along their length and are press-fitted into the frame-sealing elements. These sealing elements each comprise a plate-shaped insert which is provided on both sides, i.e. facing the walls of the respective groove, over its periphery with sealing rings by means of which the intended sealing is effected in the radial and axial direction.

The object on which the invention is based is to allow efficient sealing with a sealing element of simple construction.

SUMMARY OF THE INVENTION

According to the invention, use is made for this purpose of a sealing element in which the groove width is occupied by the sealing frame, which for this purpose has an encircling, inwardly open U-shaped limb cross section, with the result that loading of the frame in the direction of the groove walls and in the direction of the encircling sealing boundaries is achieved by means of the fluid pressure building up in the interior of the frame. According to the invention, this pressure build-up is made possible by the fact that the connection with the respectively pressurized working chambers opens into the frame interior, the simplest method of achieving this being in each case at least one hole passing transversely through the respective vane. In the context of the invention, a short-circuit connection is at the same time avoided by the fact that the inner sealing insert is designed as a blocking diaphragm which engages at the edge in the encircling channel of the sealing frame, with the result that pressure building up on one or other side leads to corresponding transverse loading, by means of which the diaphragm is pressed against one of the channel walls.

In this configuration in accordance with the invention of the sealing element, this sealing element comprises just two parts which can advantageously be connected by fitting the inner sealing insert into the frame and which can be installed easily. Tolerance problems are largely avoided with the solution according to the invention and it has proven particularly expedient, particularly as regards the use of the sealing element according to the invention in a pivot motor with relatively short pivoting travels, if the sealing frame is composed of an elastomer, e.g. a rubber-like material, which has a relatively high flexibility in the circumferential direction too, i.e. as regards the spacing of the limbs of the frame relative to one another, thus giving high adaptability with the capacity for good tolerance compensation. At the same time, it is also possible for a certain preload to be applied to the sealing frame by means of the inner sealing insert, and to do this both in the sealing plane and transversely to this.

In order to achieve high stability, even when using elastomeric material, and to do this with low coefficients of friction, it has proven expedient to coat this material on the outside, e.g. with proportions of PTFE applied, sprayed on or introduced into the elastomer mixture.

In order at high pressure loading to avoid high pressures on the frame walls acted upon by the inner sealing insert and bounded by the channel—referred to below for short as channel walls—it has proven expedient to thicken the sealing insert at least in part in the area within the frame, more specifically such that the thickened portion forms a travel limiter by support against the respective groove wall.

The solution according to the invention also offers the possibility of cutting out relatively large cross-sectional areas of the groove walls as connecting paths to the working chamber respectively supplied with pressure medium, in particular pressure fluid, thus also allowing the pivot motor to be made lighter in weight in conjunction with the configuration in accordance with the invention of the sealing element.

BRIEF DESCRIPTION OF THE DRAWINGS

Further details and features of the invention will become apparent from the subclaims. The invention is furthermore explained in greater detail with further details and features with reference to the drawings, in which:

FIG. 1 shows a first embodiment of a sealing element according to the invention arranged in a vane of a pivot motor, in a schematized sectional representation, FIG. 2 shows a second embodiment according to the invention of a sealing element in a representation corresponding to FIG. 2, FIG. 3 shows the frame of a sealing element in accordance with FIGS. 1 or 2, in a schematized plan view of the frame plane, FIGS. 4+5 show schematized sectional representations of the frame in accordance with FIG. 3 in a section along the line IV, V—IV, V, Figure. 6 shows the sealing insert of a sealing element according to the invention in a view corresponding to FIG. 3, FIGS. 7+8 show two different configurations of the sealing insert in accordance with FIG. 6 in an end view, and FIGS. 9+10 show sectional representations, corresponding to the two views in accordance with FIG. 7 and FIG. 8, of the two different embodiments of the inner sealing insert, in each case in a section along the line IX, X-IX, X.

DETAILED DESCRIPTION OF THE PREFERRED EMBODIMENTS

The starting point for the illustrations is a pivot motor as can be found in principle in FIG. 1, for example, of DE 43 37 815 C1. In this pivot motor, a housing closed at the end by a cover, for example, and a shaft guided in the housing enclose an annular working space in which are arranged vanes on the housing and the shaft which are offset relative to one another in the circumferential direction, which overlap one another radially and in the tip region of which grooves running the length of the vanes are provided in each case. Sealing elements are arranged in the grooves. The vanes with the sealing elements arranged therein delimit working chambers from one another, it being possible to supply these working chambers alternately with pressure medium, thus allowing the housing and the shaft to be pivoted relative to one another. One area of application for pivot motors of this kind is, for example, the suspension of vehicles, the pivot motors being installed in the web region of anti-roll bars in order to influence the handling by twisting the halves of the anti-roll bars relative to one another.

FIGS. 1 and 2 each show a detail of a pivot motor of this kind, each of them showing part of a shaft vane, more specifically in a section taken transversely to the longitudinal extent of the vane to reveal in cross section the sealing element, which is in each case inserted at the tip end in a guide groove.

More specifically, the vanes are each denoted by 1, the grooves made in them in the tip region and extended over the length of the vanes 1 by 2, and the working chambers (not shown in greater detail here), which are separated from one another by the vanes 1, by 3 and 4. Arranged in the grooves 2 are sealing elements 5, 6 of fundamentally the same construction, these having a rectangular sealing frame 7, 8, which runs around the rectangular periphery, and an inner sealing insert 9, 10.

With its two longitudinal limbs 11, 12, the sealing frame 7, 8 rests on the one hand on the base of the groove 2 and on the other hand, at the open end of the groove 2, on the peripheral wall 13 of the housing (not shown in greater detail) of the pivot motor. The limbs at the ends of the sealing frame 6 or 7 are denoted by 14 and 15 and provide sealing in a way not shown in any more detail in the area of the ends of the vanes 1 with respect to the closing parts at the end of the working spaces, that is to say, for example, covers.

The limbs 11, 12 and 14, 15 each have a U-shaped cross section, with the result that the frame 7 or 8 forms an all-round channel which is open towards the interior 16 of the frame and in which the plate-shaped sealing insert 9 or 10 engages. The sealing insert 9,10 is thus held by its peripheral edges in the channel formed by the U-shaped cross section of the limbs 11, 12 and 14, 15, covering the interior 16 of the frame over its full area, and, within the scope of the invention, it forms as it were a blocking diaphragm, since connections 17, 18, which, as in the exemplary embodiment, can in the simplest case be formed by holes passing through the vanes 1 in the region of the groove 2 and come from the mutually opposite working chambers 3, 4, open onto the interior 16 of the frame.

If one or the other working chamber 3 or 4 is supplied with pressure medium, this pressure medium also acts, via the connection 17 or 18, on the frame interior 16 surrounded by the frame 7 or 8, the said interior being divided in the longitudinal direction of the groove 2 by the sealing insert 9 or 10. This sealing insert 9 or 10 is accordingly pushed towards the side adjacent to the chamber 3 or 4 at lower pressure and, at the same time, is supported against the corresponding groove wall via the channel wall in between. In accordance with the all-round action of the pressure, the frame 7 or 8 is additionally pushed outwards and against the other, opposite, groove wall, thus ensuring the all-round sealing aimed for. And this is achieved with a very simple construction of the sealing element 5, 6 since the latter comprises just the sealing frame 7 or 8 and the sealing insert 9, 10, which can moreover be configured in such a way that the sealing element 5, 6 forms a prefabricated unit, it being possible for the sealing insert 9 or 10 to be fitted into the sealing frame 7 or 8.

In order to achieve the sealing effect aimed for, the use of a sealing frame 7, 8 with an enclosed periphery requires that, based on the respectively acting forces, this frame should be expandable essentially within the range of tolerance compensation and can also be spread open relative to the channel walls.

However, the way in which the sealing frame 7, 8 is guided in the groove 2 also makes it possible, according to the invention, for the sealing frame to employ materials of higher elasticity than, for example, PTFE, in particular also elastomeric materials, it also being possible, with a view to as favourable friction coefficients as possible, for such rubber-elastic materials to bear anti-friction coatings at least on those of their surfaces which are affected in this respect.

Particularly in conjunction with sealing frames 30 7, 8 made of elastomeric materials, but without limitation to these applications, it has furthermore proven expedient within the scope of the invention to apply a certain preload to the sealing frame via the sealing insert 9, 10, thus ensuring that the respective sealing element 5, 6 forms a sealing barrier between the two working chambers 3 and 4 even before pressure has been applied.

If a corresponding preload is intended to act essentially only in the direction of the boundary walls of the housing and the shaft, it has proven expedient to construct the channel 19 formed by the U-shaped cross section of the limbs 11, 12 and 14, 15 of the sealing frame 7 with parallel channel walls, that is to say matched to a sealing insert 9 such as that illustrated or indicated in FIGS. 1, 7 and 9, this sealing insert 9 having a disc-shaped collar 25 which engages in the channel 19.

In the configuration in accordance with FIGS. 2 and 5, the channel 20 has an undercut cross section, and the sealing insert 10 in accordance with FIGS. 2, 8 and 10 is provided with an annular bead 26 on the outer circumference, it being possible to determine the degree of preloading by the dimensioning of the annular bead and of the wall thickness of the limbs.

The frames limbs 11, 12, 14, 15 are preferably sharp-edged at their outer edges, as indicated in FIG. 3. As regards the side walls 21 and 22 (FIG. 4, FIG. 5), which come to rest against the walls of the groove 2, it may prove expedient to embody these with a certain convexity and, if appropriate, also to set them back somewhat in the direction of the interior of the frame, with the result that substantial wide-area contact is achieved only under the influence of a specifically applied preload and/or of the pressure build-up in the channel 19, 20.

FIGS. 6 to 10, in particular, also illustrate that it may be expedient within the scope of the invention to make the sealing insert 9 or 10 thicker in its central area surrounded by the frame 7 or 8. Corresponding thickened portions are indicated by 23 and 24, and the displacement in the direction of the respectively adjacent groove wall is limited by one of these under lateral pressure application, thus avoiding impermissibly high loading of the channel walls at higher pressures, something which could lead to flow of the material or impermissibly high unit surface pressures depending on the nature of the material of the sealing frame, in the case of elastomeric materials, for example.

Comparison of FIGS. 3 and 6 shows that the sealing frame 6 or 7 has a rectangular contour as regards it outer periphery but that rounded corner areas are expedient for the sealing insert 9 or 10. A corresponding shape of the channels 19, 20 formed by the U-shape cross-sectional contour of the limbs 11, 12 and 14, 15 makes it possible to reinforce the corner areas of the sealing frame 7, 8 by accumulation of material, even in the case of the sealing frames made of elastomeric materials, thus ensuring a good sealing effect even in the corner areas.

While the above description constitutes the preferred embodiment of the invention, it will be appreciated that the invention is susceptible to modification, variation, and change without departing from the proper scope or fair meaning of the accompanying claims.

What is claimed is:

1. A pivot motor, comrprising:

a housing surrounding an annular working space closed at its ends;

a central motor shaft;

radially overlapping housing and shaft vanes, the vanes offset relative to one another in a circumferential direction and delimit working chambers with respect to one another, the working chambers following one another in the circumferential direction and configured to be supplied alternately with a pressure medium, a tip region of the vanes provided with axially continuous grooves; and sealing elements accommodated in the grooves and forming a barrier transversely to an extent of the grooves and including an outwardly expandable sealing frame and an inner sealing insert inserted into a frame interior surrounded by the frame and interacting with frame limbs, the frame subjected to pressure medium by connection of the groove to an adjacent working chamber supplied with fluid;

wherein the limbs include an inward-opening U-shaped cross-section, the sealing frame arranged in the groove surrounding in a sealing manner the frame interior in a region of connections of the groove to the adjacent working chambers open into the groove and are delimited with respect to one another by the inner sealing insert, the inner sealing insert engaging an encircling channel formed by the U-shaped cross-section of the limbs as a blocking diaphragm.

2. The pivot motor according to claim 1, wherein the inner sealing insert has a plate-shaped contour.

3. The pivot motor according to claim 1, wherein the thickness of the inner sealing insert in its region engaging in the channel is greater than the clear width of the channel.

4. The pivot motor according to claim 3, wherein an outer periphery of the inner sealing insert is designed as an encircling reinforced annular bead.

5. The pivot motor according to claim 4, wherein the diameter of the annular bead is greater than the receiving free cross section of the channel.

6. The pivot motor according to claim 3, wherein a central area of the inner sealing insert, surrounded by the sealing frame, is thicker than the inner sealing insert region engaging in the channel.

7. The pivot motor according to claim 6, wherein the inner sealing insert is designed as a plate of graduated thickness relative to the frame.

8. The pivot motor according to claim 6, wherein the plate forming the inner sealing insert is of symmetrical design with respect to a central plane.

9. The pivot motor according to claim 8, wherein a respective step-shaped thickened portion in the central area of the inner sealing insert is smaller than the thickness of the corresponding wall of the channel.

10. The pivot motor according to claim 9, wherein the sealing frame is composed of an elastomeric material.

11. The pivot motor according to claim 10, wherein the sealing frame is provided at least in part with an anti-friction coating.

* * * * *